Aug. 8, 1944.   H. R. JOHNSON   2,355,076
TREATMENT OF HYDROCARBONS
Filed Oct. 17, 1941
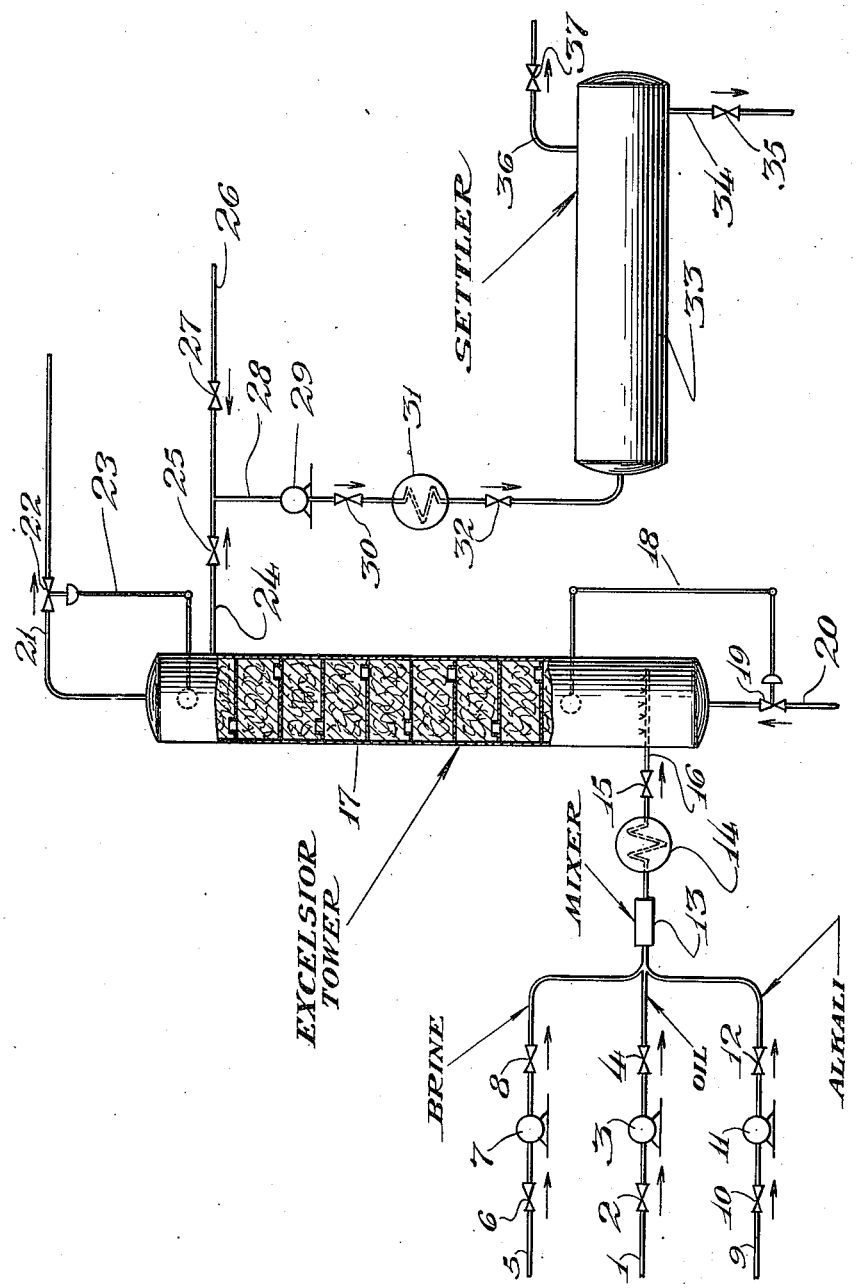

Patented Aug. 8, 1944

2,355,076

UNITED STATES PATENT OFFICE 2,355,076

TREATMENT OF HYDROCARBONS

Harley R. Johnson, Tulsa, Okla.

Application October 17, 1941, Serial No. 415,380

7 Claims. (Cl. 252—325)

This invention relates to a process for treating crude petroleum oils to remove foreign material therefrom. More particularly, it relates to a process for removing salt and other undesirable suspended inorganic materials from crude petroleum oils by an improved method. Still more specifically, it relates to desalting crude oils which contain crystalline salt such as sodium chloride, magnesium chloride, calcium chloride, etc.

Certain crude oils contain sodium chloride and other inorganic salts in the form of suspended crystals of more or less irregular size. These crystals are usually surrounded by oily or asphaltic films difficult to penetrate and, as a consequence, the removal of salt from such crude oils by the usual methods presents a difficult problem. Thus, for example, when contacting the salt-containing oil with water the film around the salt particle prevents the water from coming in contact with the salt crystal and, as a consequence, methods employing the washing of the crude oil with hot water are not effective in reducing the salt content to an acceptable figure. The addition of demusifying agents to the water used in washing such oils has relatively small effect when the salt is present in this form. As a consequence, the reduction of salt content to less than 20 pounds of salt per 1000 barrels of oil is, in many instances, technically difficult and economically not feasible. The present invention offers a method for accomplishing the economic reduction of salt content of crude oils to a relatively low figure.

In one specific embodiment the present invention comprises mixing crude oil containing crystalline salt with a reagent comprising a solution of salt and an alkaline treating agent to maintain the pH of the crude oil and the aqueous solution at approximately the neutral point, heating the oil to about 150 to about 200° F., passing the mixture of oil and reagent through a pool of salt solution maintained at approximately 7 pH, passing the crude oil containing at most a minor part of said aqueous solution through a filtering zone containing excelsior, thereafter mixing the thusly treated oil with water, heating the mixture to a temperature of approximately 250° F. to about 375° F., more or less, and a pressure sufficient to maintain the water and crude oil in substantially liquid phase, passing the mixture while maintained at these conditions into a settling zone, withdrawing the aqueous layer, and recovering the desalted crude oil.

One embodiment of the invention is illustrated in the accompanying drawing which is diagrammatic and should not be construed as limiting it to the exact conditions shown.

The salt-containing crude oil is introduced through line 1, containing valve 2, pump 3, and valve 4. As previously mentioned, crude oils containing salt crystals in suspension are particularly adapted to treatment by this process although other oils may be treated as well, often with improved results. The process is particularly useful in treating oils which are difficult or impossible to desalt with by conventional methods, and it is with such oils that the advantages of the process become the most apparent.

The oil is mixed with an aqueous salt solution hereinafter referred to as brine. This may be a solution of sodium chloride or a mixture of sodium chloride and other soluble salts. A part of the brine produced in the process may be used in this step, either with or without concentrating or diluting as may be necessary. The brine is introduced through line 5, valve 6, pump 7, and valve 8. In order to maintain a pH at the proper value for obtaining the best results, an alkaline solution may be introduced through line 9, valve 10, pump 11, and valve 12 when the crude oil has an acidic reaction.

Since many of these crude oils are acidic in reaction, it is necessary to use the alkaline solution to bring the pH value to approximately the neutral point. Good results can be obtained by varying this slightly—for example, the total system may be slightly on the alkaline side but is best kept at pH 7 to about 8. Since the acidity of the oil varies considerably with the manner of production and with the source, the requirements of alkali may vary. Either fresh alkaline solutions or solutions such as partially spent sodium hydroxide previously used in other parts of the refinery may be used.

The mixture of brine, crude oil, and alkali are passed through mixer 13, heat exchanger 14 or its equivalent, and valve 15 which is contained in line 16, and is introduced into the bottom of excelsior tower 17. A pool of brine is maintained in the lower portion of this tower below the packing. This phase of the treatment may also be carried out in a separate vessel. The mixture of crude oil, brine, and alkali may be introduced through a spray near the bottom of this pool. Any method of controlling the liquid level is acceptable but is illustrated as a liquid level controller 18 which actuates valve 19, which is contained in line 20. A part of the brine from this step may be made to the proper concentration and returned for use in the mixing step by means not shown. The concentration and amount of brine mixed with the oil in the first step may vary somewhat but the solution preferably contains about 3 to about 10% by weight of dissolved salt. The quantity may vary considerably but is usually of the order of 10% by volume of the oil. The amount of alkali added to the oil and brine is such that a pH of 7 to about 8 is maintained in the bottom of tower 17.

The oil separates more or less completely from the brine solution and passes upward through the tower which contains a packing material consisting essentially of excelsior. The tower packing is designated as excelsior which is made by shredding various kinds of wood. Any type of excelsior may be used but that produced from pine logs has been found to be particularly useful. Instead of excelsior, but not necessarily exactly equivalent to it, other wood products may be used, such as coarse sawdust, wood shavings, and the like. Excelsior is particularly beneficial because of its form which permits the ready passage of the oil and at the same time affords contact. If some form of wood which is too coarse is used, the proper contact with the oil is not obtained and, on the other hand, if it is too fine passage through the material is unduly low because of the high pressure drop.

It is not understood as to exactly why the excelsior is such an efficient material for this purpose. It may be because of certain constituents of the wood which tend to assist in breaking down the oily or asphaltic film with which the salt crystals are surrounded, possibly due to some preferential wetting effect of the oil surrounding the salt particle on the excelsior with which it comes in contact. There may even be an actual chemical reaction between components of the wood and the constituents of the film. However I do not intend to be bound by these or other explanations for the benefits realized.

After being used for a considerable time the excelsior loses its effectiveness and this may be restored in part by treating it with steam and/or solvents, thereby removing coatings of oil from the excelsior. Since there is usually an accumulation of silt-like material in the filter bed, it is sometimes necessary to thoroughly wash the excelsior to remove the silt. As a rule excelsior is sufficiently cheap and the length of time for which it can be used is sufficiently long so that it hardly pays to resort to recovery methods but rather merely replace the excelsior from time to time.

The combined brine and filtering treatment through the packing material effects comparatively little removal of salt from the oil as is shown by the fact that an oil entering with about 200 pounds of salt per thousand barrels of oil leaves the top of the excelsior tower with only about 20% reduction in salt content. Microscopic examination of the crude oil entering and leaving the tower shows that the salt crystals when entering the system vary more or less in size while those leaving the tower appear to be of fairly uniform particle size. Apparently the excelsior exerts two effects on the salt crystals; one, to assist in breaking the oil or asphaltic film about the crystals, and the other to retain them in the tower for such a length of time as to permit a decrease in the crystal size of the larger crystals, which may make them more readily soluble in hot water. However, I do not intend to be bound by any explanation which may be offered for the benefits of the process.

The temperature maintained in the excelsior tower may be of the order of about 150 to about 200° F., more or less, and preferably about 170° F. Relatively low pressure may be used but this does not seem to be critical beyond preventing undue vaporization.

The excelsior packing may be supported in any desirable fashion but it has been found advantageous to use apparatus of such design that the oil follows a tortuous path through the packing material.

If the crude oil contains gas, which it usually does, this may separate in the top section of the tower 17, and be removed through line 21, containing valve 22, which is actuated by liquid level controller 23 or its equivalent. The gas may be passed directly to the crude oil fractionating system or to a gas recovery system, not shown. The crude oil is removed from the tower through line 24, containing valve 25, and is mixed with water entering from line 26, containing valve 27. Treated water, substantially neutral in character, is preferably used in this step—for example, boiler water which has been heated to reduce its total hardness is satisfactory. The mixture passes through line 28, containing pump 29, valve 30, heat exchanger 31, and valve 32. It is heated in exchanger 31 to a temperature preferably of the order of about 275° to approximately 350° F. and a pressure sufficient to maintain both the solution and the oil in substantially liquid phase. The temperature may vary considerably but is usually higher than that used in the excelsior tower. As a rule the temperature is within the range of about 250° to about 375° F. more or less. It is understood that higher or lower temperatures and pressures may be used with varying degrees of success but experience has shown conditions of the order indicated are about optimum.

The mixture of oil and water is introduced to settler 33 which usually contains no packing and is of conventional design. A horizontal settler, as illustrated, has been found satisfactory although the invention is not limited and equivalent apparatus may be employed. Water containing dissolved salts is removed through line 34, containing valve 35, and the desalted crude oil is removed through line 36, containing valve 37, to subsequent consumption in the refinery.

The following illustration will show the benefit of the process of my invention but should not be regarded as unduly limiting it.

West Texas crude oil from Slaughter Field contains large quantities of salt which may vary from 150–250 pounds per thousand barrels and even more. When working with a crude oil containing about 200 pounds of salt per thousand barrels of oil the following results are obtainable:

When operating according to my invention using 5% by volume of a 6% brine solution and maintaining the pH in the bottom of tower 17 at 7, using both the excelsior packed tower and the horizontal settler, the salt content of the crude oil is consistently reduced to less than 20 pounds per thousand barrels of oil and volumes of 10 to 12 pounds or less are common.

When treating the oil with 5% by volume of 6% brine solution and using only the excelsior tower the salt content was reduced to about 180 pounds per thousand barrels. Most of this salt appears to be removed in the form of sediment which may be included in mud or bits of shale contained in the crude oil and removed by filtration through the excelsior tower.

When treating the crude oil with either water or 5% brine solution and when using only the horizontal settler 33 without the excelsior tower, the salt content is only rarely reduced below 50 or 60 pounds per thousand barrels. When reversing the process, that is, treating with hot water, settling, treating with brine and passing the oil over excelsior, the salt content averages from 40 to 60 pounds per thousand barrels.

When operating a cracking plant on this crude oil containing 50-60 pounds of salt, the average length of runs obtainable is of the order of 25 to 28 days on stream. When operating the cracking unit on oil desalted by my process to less than 20 pounds of salt per thousand barrels of oil, runs of 50 to 60 days or more are obtained.

I claim as my invention:

1. A process for desalting crude hydrocarbon oil which comprises treating said oil with brine solution maintained substantially at the neutral point at a temperature above about 150° F., contacting the oil with a filtering material comprising essentially wood, thereafter treating the oil with water at a superatmospheric temperature above that used in the brine treatment and at a pressure adequate to maintain the system in substantially liquid phase, and separating the desalted crude oil from the water.

2. A process for desalting crude hydrocarbon oil which comprises treating said oil at a temperature of from about 150° to about 200° F. with brine solution, contacting the oil with a filtering material comprising essentially wood particles at substantially the same temperature, thereafter mixing the oil with water and heating the mixture to a temperature of from about 250° to about 370° F. under a superatmospheric pressure sufficient to maintain the mixture in substantially liquid phase, and separating the crude oil from the water.

3. A process as defined in claim 1 wherein said wood comprises excelsior.

4. A process for desalting crude hydrocarbon oil which comprises mixing said oil with brine solution maintained at substantially the neutral point, passing said mixture through brine solution maintained at substantially the neutral point and at a temperature of from about 150° to about 200° F., separating oil from the brine and passing the oil substantially free of brine and at substantially the same temperature through a filtering material comprising wood particles, treating the filtered oil with water at a temperature of from about 250° to about 375° F. under a pressure adequate to maintain the mixture in substantially liquid phase, and thereafter separating the desalted oil.

5. A process as defined in claim 1 wherein said wood comprises wood shavings.

6. A process as defined in claim 1 wherein said wood comprises sawdust.

7. A process for desalting hydrocarbon oil which comprises treating said oil with a brine solution at an elevated temperature not in excess of about 200° F., contacting the oil with a filtering material comprising wood particles, thereafter treating the oil with water at a temperature above that used in the brine treatment and at a pressure adequate to maintain the system in substantially liquid phase, and separating the desalted oil.

HARLEY R. JOHNSON.